Nov. 20, 1934.    R. W. STEM    1,981,679
FURNACE CONTROL
Filed Nov. 30, 1931    2 Sheets-Sheet 1
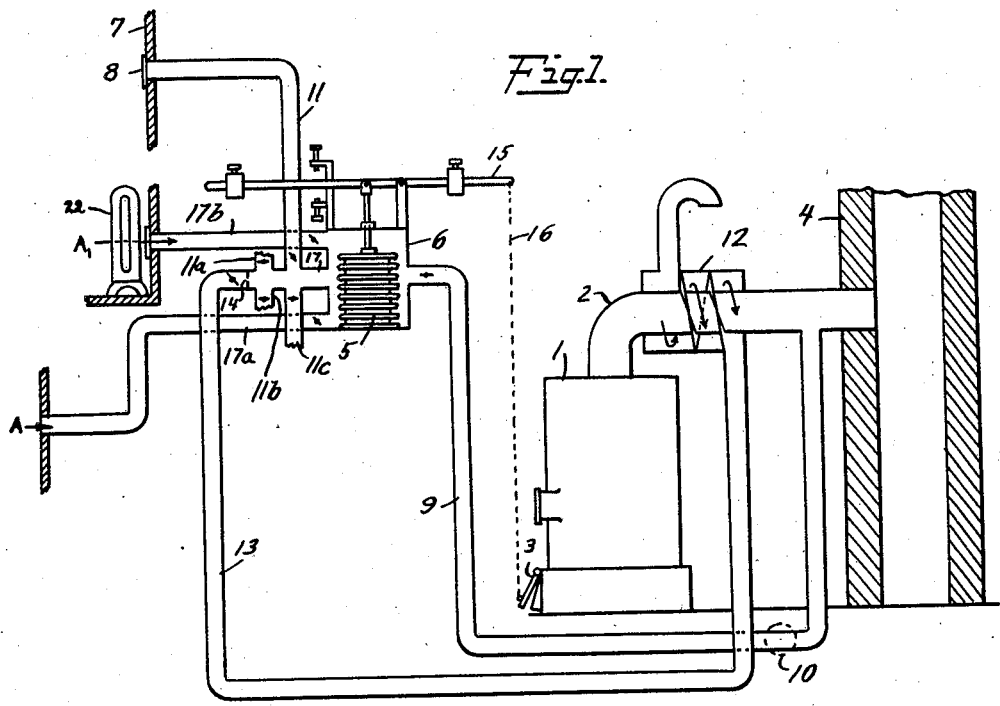
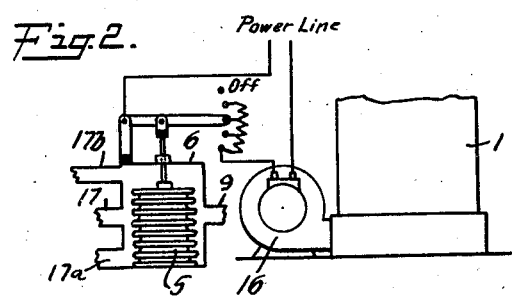
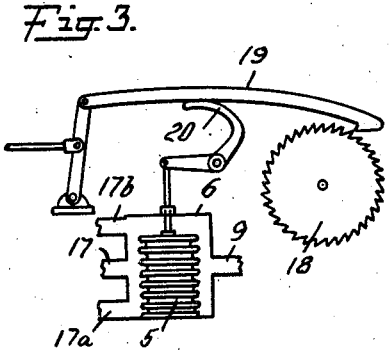
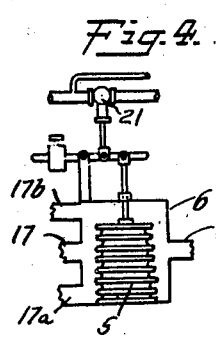
INVENTOR
Russell W. Stem
BY
Pennie, Davis, Marvin + Edmonds
ATTORNEYS

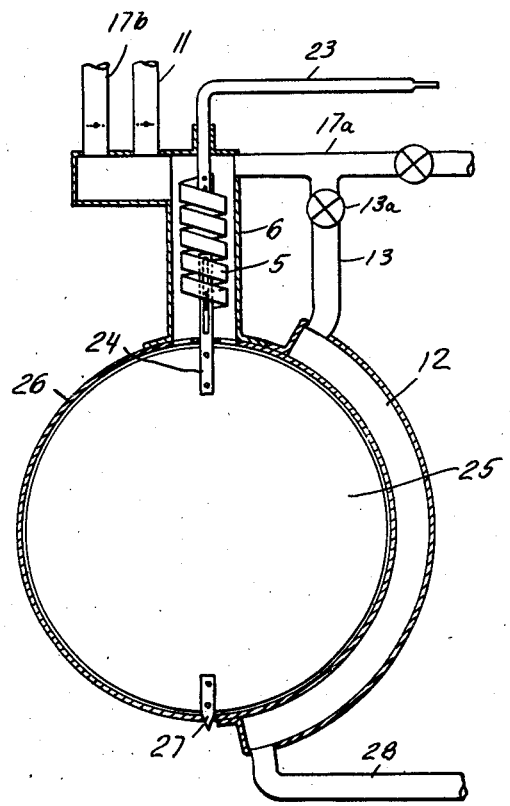
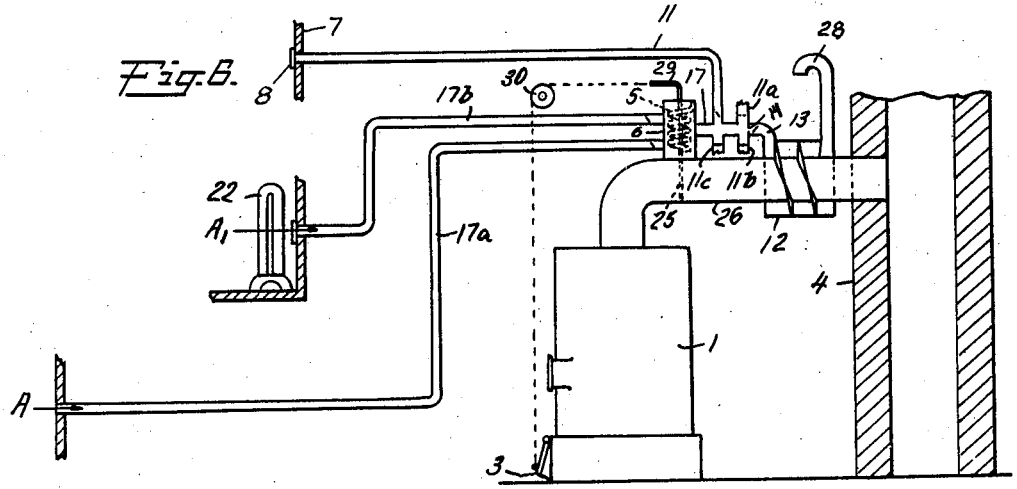

Patented Nov. 20, 1934

1,981,679

UNITED STATES PATENT OFFICE 1,981,679

FURNACE CONTROL

Russell W. Stem, Bethlehem, Pa.

Application November 30, 1931, Serial No. 578,072

29 Claims. (Cl. 236—91)

This invention relates to improvements in the thermostatic control of furnaces used for heating houses, offices, shops and other buildings and the like. The invention is of special value and application in connection with the use of solid fuels such as coal and coke, and in the burning of gaseous fuels such as natural and manufactured gas, but it also has certain advantages in the burning of liquid fuels such as oil.
The present application is in part a continuation of my prior application filed December 23, 1930, Serial Number 504,267.

In conventional practice a thermostat actuated by the temperature in the enclosed space to be heated is arranged to initiate, or to accelerate or promote, combustion in the furnace when the temperature in this space falls below a predetermined minimum limit and to stop, or to retard or inhibit, combustion in the furnace when the temperature in this space rises above a predetermined maximum limit. While the results so obtained are fairly satisfactory with respect to control of the temperature in that part of the enclosed space to be heated in which the thermostat is arranged, within the limits of the thermostats used, this practice disregards several elements essential to efficient operation of the furnace and is subject to the limits of a single thermostat arranged in one part of the enclosed space to be heated.

The present invention provides an improved thermostat arrangement which has several important advantages. The invention includes an improved thermostat arrangement by which a wide range of factors determining the temperature in the enclosed space to be heated and the efficiency of operation of the furnace may be correlated to adjust each with respect to one or more of the others to secure satisfactory temperature regulation and at the same time to promote efficiency of operation.

The invention will be further described in connection with the accompanying drawings which illustrate, diagrammatically and conventionally, several embodiments of the invention. In the drawings, Fig. 1 illustrates an embodiment of the invention embodying damper control, Fig. 2 illustrates an embodiment of the invention embodying control of motor driven means for effecting combustion, Fig. 3 illustrates an embodiment of the invention embodying stoker control, Fig. 4 illustrates an embodiment of the invention embodying control of the rate of fuel supply, Fig. 5 illustrates a modification of the invention embodying damper control and Fig. 6 is a further illustration of the invention embodying the features illustrated in Figures 1 and 5. It is intended and will be understood that the accompanying drawings are intended merely to illustrate the invention and that they are not to be interpreted in any limiting sense.

Figures 1 and 6 of the accompanying drawings illustrate a heating furnace 1 which comprises the usual fire-box in which fuel is burned, heat transferring surfaces over which the hot products of combustion from the fire-box pass for the transfer of heat to the heating medium, air, water or steam for example, used in the heating system and a stack flue 2 communicating with a chimney 4 through which the hot gases from the fire-box which have passed over the heat transferring surfaces escape. A conventional damper for controlling the admission of air to the fire-box through a grate on which coal or coke, for example, is burned is shown at 3.

Instead of being arranged in the space to be heated, as in conventional practice, the thermostat responsive to the temperature in the enclosed space to be heated, the thermostat 5, is arranged in a thermostat chamber 6 appropriately insulated, thermally, and remotely situated with respect to the enclosed space to be heated, a room 7 in a building for example, which is connected to one or more pilot orifices such as pilot orifice 8 in the enclosed space to be heated so that a flow of air is maintained from the enclosed space to be heated through the orifice 8 and thence through the chamber 6.

According to the present invention, a flow of one or more streams of air or other gaseous medium, the temperature or temperatures of which reflect one or more factors determining the temperature of the enclosed space to be heated, is also maintained through the chamber 6 and the relative rates of flow of said air from the enclosed space to be heated and of the one or more streams of air or other gaseous medium through the chamber 6 are proportioned to give each of the factors its correct weight in establishing the mean temperature in the chamber 6 to which the thermostat 5 responds. The flow of air from the enclosed space to be heated and of the stream or streams of air or other gaseous medium through the chamber 6 is maintained in the embodiment illustrated in Fig. 1, by means of connection 9 between the chamber 6 and the chimney 4. A fan or blower or the like, as indicated at 10, may be provided to assist in maintaining this flow if the pressure differential provided by the chimney is irregular or insufficient.

The chamber 6 may be made to integrate temperatures in a plurality of enclosed spaces to be heated by connection to pilot orifices similar to pilot orifice 8 arranged in each of them through connections corresponding to connection 11, such as 11a, 11b, 11c, etc., and the relative weights of the temperatures prevailing in each of such a plurality of enclosed spaces with respect to the operation of the thermostat 5 may be proportioned by valves or dampers as illustrated in the several connections. The arrangement of the thermostat chamber away from the enclosed space to be heated as just described is described in my prior application filed October 17, 1930, Serial No. 489,322. This arrangement of the thermostat chamber 6 is particularly advantageous in conjunction with the present invention since it enables the use of a thermostat large enough itself to develop the power required to operate, for example, a damper control. The thermostat proper arranged within the thermostat chamber may consist, for example, of a bellows partially filled with a working medium such as di-ethyl ether.

Referring now to Figures 1 and 6 of the accompanying drawings, A, A₁, etc. represent incoming streams of air or other gaseous medium which reflect, for example, (1) outdoor temperatures, (2) water temperatures in a hot water heating system, (3) steam temperatures in a steam heating system, (4) the temperature of outgoing hot air in a hot air heating system, or, (5) the temperature of return air in a hot air heating system. In the application of the present invention, it may be desirable to employ streams of air or other gaseous medium which reflect the temperature of any or all factors which may affect the temperature of the enclosed space to be heated and it is understood and intended that the foregoing list of factors affecting the temperature of the enclosed space to be heated are merely illustrative and that the invention is not limited thereto.

In one way of carrying out the present invention, a flow of air or other gaseous medium, the temperature of which reflects the outdoor temperature, is maintained through the chamber 6 along with air from the enclosed space to be heated and the relative rates of flow through the chamber 6 are proportioned to give each of these factors its correct weight in establishing the mean temperature in the chamber 6 to which the thermometer 5 responds. In this embodiment of the present invention, the changes in outdoor temperature are given full weight and a more satisfactory and uniform method of temperature control is provided than in those cases where temperature control is sought merely by the use of air from the room to be heated. From the foregoing example, it will be apparent that the temperature of the enclosed space to be heated may be controlled by a flow of air from the enclosed space to be heated in conjunction with a flow of a gaseous medium reflecting temperatures affecting the temperature of the enclosed space to be heated other than stack temperature through the thermostat chamber 6.

In another adaptation of the present invention, control of the temperature in the enclosed space to be heated may be secured by the correlation of three or more factors affecting its temperature; thus for example, in addition to the air from the enclosed space to be heated and air or other gaseous medium reflecting the outdoor temperature, a flow of a gaseous medium the temperature of which reflects the temperature of the gases escaping from the stack flue may also be maintained through the chamber 6. The gaseous medium, the temperature of which reflects the temperature of the gases escaping through the stack flue 2, may consist of air drawn through the heat exchanger 12 arranged about the stack flue 2 and supplied to the chamber 6 from the heat exchanger 12 through connection 13. In the form of the invention just illustrated control of room temperature and efficiency of furnace operation are very advantageously combined. For efficient furnace operation, the gases escaping from the stack flue 2 should not be too high in temperature and likewise they should not be too low in temperature. Difficulty due to variation in the temperature of the escaping furnace gases is overcome in the present invention as an increase in the temperature of the gases escaping through the furnace stack tends to decrease the rate of combustion in the furnace, while a decrease in the temperature of the gases escaping from the furnace tends to increase the rate of combustion in the furnace.

In another form of the invention, a flow of gaseous medium the temperature of which reflects water temperatures in a hot water heating system and a flow of gaseous medium, the temperature of which reflects the temperature of the gases escaping through the stack flue 2, are also maintained through the thermostat chamber 6 along with air from the enclosed space to be heated. The gaseous medium reflecting water temperatures in a hot water heating system may be heated, for example, through heat transfer with one of the risers from a hot water boiler or it may be heated as shown in Figures 1 and 6 by drawing the gaseous medium past a radiator 22 through line 17b into the thermostat chamber 6. Steam temperatures in a steam heating system may likewise be used in effecting control of the enclosed space to be heated and similarly the gaseous medium reflecting steam temperatures may be heated by heat exchange with the surface of transmission pipes, or the surface of the boiler itself.

As a further illustration, the present invention finds application in the employment of the temperature of outgoing hot air in a hot air heating system, or, if desired, the temperature of the return air in a hot air heating system for temperature control. In these cases the outgoing hot air or the return air itself may be, for example, the gaseous medium returned to the thermostat chamber 6. The present invention, it is thus seen, has wide application and is in no wise limited to the illustrations given. Although temperature control in the examples given has been accomplished by two or three factors, temperature control may be obtained, if desired, by the use of more than three factors. In every case, the relative rates of flow through the chamber 6 are proportioned to give each of the factors involved its correct weight in establishing the mean temperature in the chamber 6 to which the thermostat 5 responds.

By proportioning the relative rates of flow of air or other gaseous medium, the temperature of which reflects the temperature of the factors controlling the temperature of the enclosed space to be heated through the chamber 6, the mean temperature in the thermostat chamber 6 can be made representative of an integration of these temperatures in which each of the several factors involved is given its proper weight. Thus, since the thermostat 5 responds to this mean temperature, this integration of these factors, rather than any one of them, is made to govern the control of the furnace. For example, a decrease in the temperature of any of the factors tends to increase the rate of combustion in the furnace while an increase in temperature of any of the factors tends to decrease the rate of combustion of the furnace, but in accordance with this invention, each of these factors operates with respect to control of the furnace with reference to one or more of the others to secure satisfactory temperature regulation and at the same time to promote efficiency of operation.

The proportioning of the relative rates of flow of the gaseous mediums reflecting the temperatures of the various factors used to control the temperature of the enclosed space to be heated may be accomplished in a variety of ways. It may be accomplished, for example, by correctly proportioning the diameters of the tubing used for the several connections with respect to the lengths of such tubing. Or it may be accomplished, for example, by means of adjustable dampers in the several connections. In general, it is advantageous to include a limiting orifice, as indicated at 14 in Figures 1 and 6, in the connection through which the gaseous medium reflecting the temperature of the stack gases is supplied to the thermostat chamber because of the usually relatively high temperature of this gaseous medium. The temperature of this gaseous medium as it enters the thermostat chamber, however, may be much lower than the temperature of the stack gases, because of limited heat exchange between this gaseous medium and the stack gases or because of cooling of this gaseous medium on its way to the thermostat chamber for example. Similarly, the temperature of other gaseous mediums as they enter the thermostat chamber may vary somewhat from the actual temperature of the factor whose temperature they reflect, any variation in temperature however may be overcome for example, by proper proportioning of the relative rates of flow of the gaseous mediums through the thermostat chamber.

The connections 11, 11a, 11b and 11c may be of any material reasonably air-tight and adapted to withstand the temperatures attained in the heat exchanger 12, and either should be arranged so that heat losses from it are reasonably constant or should be thermally insulated.

In the embodiment illustrated in Fig. 1 of the accompanying drawings, the thermostat 5 operates the damper 3 through the linkage including a lever 15 and a chain 16, the linkage being arranged so that a decrease in the mean temperature in the thermostat chamber 6 tends to open the damper 3 and increase in the mean temperature in the thermostat chamber 6 tends to close the damper 3. The further figures of the drawings illustrate examples of applications of the invention to other types of furnace control. The same reference characters are used to designate the same or corresponding parts in the several figures.

Figure 2 of the accompanying drawings illustrates a heating furnace comprising motor driven means 16 for effecting combustion, a blower for example, controlled by a rheostat connected to the thermostat 5 arranged in the thermostat chamber 6 through appropriate linkage adapted to increase and decrease the rate of operation of the motor driven means 16 as the mean temperature in the thermostat chamber 6 decreases and increases respectively. A thermostat chamber 6 is arranged as in Fig. 1, being connected to the corresponding connections designated 9, 17, 17a, and 17b. Fig. 3 of the accompanying drawings illustrates an application of the invention to control of a mechanical stoker, the stoker feed mechanism being driven from a ratchet wheel 18 in turn driven by an oscillating pawl 19, the effective travel of the pawl in engagement with the ratchet wheel being increased and decreased as the mean temperature in the thermostat chamber 6 decreases and increases respectively by means of the cam 20 actuated by the thermostat 5. Fig. 4 of the accompanying drawings illustrates an application of the invention to control of a gas fired furnace, the thermostat 5 being connected to a throttle valve 21 so as to open and close this throttle valve as the mean temperature in the thermostat chamber 6 decreases and increases respectively. The mode of application of the invention in connection with various types of furnace control will be apparent from these examples.

In the modified form of the invention shown in Figure 5 control of the temperature of the enclosed space to be heated is obtained by means similar to those previously described. Referring now to Figure 5, 6 represents a thermostatic chamber attached to a furnace stack 26 and containing a thermostatic helix 5. The thermostat 5 is mounted on a slotted spindle 24 which is joined or attached to a turn-damper 25, the damper 25 being maintained in position by means of a pivot member 27 contacting with the wall of the furnace stack 26. By means of adjusting handle 23 the thermostat 5 may be laterally adjusted within the thermostat chamber 6. Passages 11, 12, 13, 17a, 17b and 28 provide means for flow of air or other gaseous mediums through the thermostatic chamber 6, as will hereinafter be more fully described.

As an illustration of the foregoing modification of the present invention, a flow of air or other gaseous medium the temperature of which represents the outdoor temperature is maintained by means of pipe 17a through the thermostat chamber 6 while the thermostat 5 is subjected to the influence of the stack temperature through radiation directly. The thermostat 5 may be of any suitable type, a bellows type, gas filled may be used, if desired, in place of the bi-metal thermostat shown. If the thermostat 5 is not sufficiently subjected to the influence of the stack temperature through radiation, a gaseous medium may be passed in heat exchange with the furnace stack 26 and admitted to chamber 6 by means of passages 28, 12, 13 and 17a. As shown in Figure 5, a gaseous medium which reflects the outdoor temperature is drawn through the chamber 6 by the suction of the furnace stack 26; if the suction provided by the furnace stack is irregular or insufficient, suitable forcing means may be employed to assist in maintaining this flow, as well as the flow of other gaseous mediums. By means of spindle 24 which is slotted to permit a lateral adjustment of the thermostatic helix 5 the relative effect of the stack temperature as compared to the temperature of the gaseous stream through the thermostat chamber 6 may be varied at will. The relative effects of the factors effecting the temperature of the thermostat 5 may be varied in a great variety of ways as for example, the volume of gas through the thermostat chamber 6 may be controlled by valving, or the effective area of heat transfer 12 can be varied to accomplish the desired result. In the present example, a drop of one degree F. in the outdoor temperature will permit the stack temperature to rise approximately 10° F., which rise in stack temperature is ordinarily sufficient to offset the additional heat losses through the walls resulting from such a drop in the outdoor temperature. It is obvious that the above example is by way of illustration only, as poorer heat plants would require a greater ratio than 10 to 1 while better heat plants would not require a ratio as great as 10–1. The desired ratio may be readily obtained by placing the thermostatic helix 5 closer to or farther from the stack, as required, by means of a lateral adjustment of adjusting handle 23 or by any of the means suggested above.

The modification of the invention shown in Figure 5 is not limited to the foregoing illustration as other temperature factors may be employed in addition to the outdoor and stack temperature factors, for example, a flow of air from an enclosed space to be heated may be maintained through the thermostat chamber 6 by means of line 11 or a flow of gaseous medium the temperature of which reflects the temperature of the heating medium (steam, hot air, hot water, etc.) may also be maintained through the thermostat chamber 6. In case the heating medium is hot air, the gaseous medium flowing through the thermostat chamber may be the hot air itself; however, in the case of steam or hot water heating plants, the gaseous medium is heated by heat transfer from boiler pipes, radiators or the like. It is apparent that the temperature of the enclosed space to be heated is thus determined by an integration of the temperatures of the factors which control its temperature and that the relative weight of each factor may be properly given effect to, for example, by any of the means suggested. The temperatures of several enclosed spaces may be controlled similarly as described in connection with the embodiment illustrated in Fig. 1. In every case, a decrease in the mean temperature of the thermostat chamber 6 tends to increase the rate of combustion in the furnace while an increase in the mean temperature of the thermostat chamber tends to decrease the rate of combustion in the furnace.

Figure 6 illustrates an adaptation of the invention embodying damper control in which the embodiment of Figures 1 and 6 are combined, and in which the same or corresponding parts are designated by the same reference numeral as in Figures 1 to 5. Special reference need be given but to a few elements of Fig. 6. 29 represents an element which performs the functions of both element 15 (Fig. 1) and element 23 (Fig. 5), while pulley 30 operates in conjunction with element 29 to permit raising and lowering of the damper 3 to increase or decrease the supply of air to the furnace 1 as may be necessary.

The operation of the invention illustrated in Figure 6 has been completely described in connection with Figures 1 to 5, and accordingly, extended illustrations, involving needless repetition, are believed to be unnecessary. In the embodiment illustrated in Figure 6, the temperature of the furnace stack gases is reflected mainly by radiation, however, if for any reason the temperature of the furnace stack gases is not sufficiently represented by radiation alone a flow of gaseous medium reflecting the temperature of the furnace stack gases may be maintained through the thermostat chamber 6. By means of element 29 which permits a lateral adjustment of the thermostat 5, it is possible to prevent the furnace stack radiation from having any material effect on the thermostat 5 and control of the temperature in the enclosed space to be heated may thus be accomplished without use of the furnace stack temperature. Element 29, besides permitting a lateral adjustment of the thermostat 5 within the thermostat chamber 6, may also be so adapted as to control the admission of air to the furnace 1 by raising or lowering the damper 3 in accordance as the mean temperature of the chamber 6 increases or decreases. Damper 25, as described in connection with Figure 5, is arranged so as to open or close respectively as the mean temperature in the thermostat chamber 5 decreases or increases. In the embodiment shown in Figure 6, dampers 3 and 25 simultaneously open or close as the mean temperature in the chamber 6 decreases or increases. Furnace control is not limited to the illustration given, the mode of application of the invention in connection with various types of furnace control is apparent from the example given in connection with Figures 2 to 4.

I claim:

1. An improved heating furnace control comprising a thermostat chamber, means for maintaining a flow of air from an enclosed space to be heated through said chamber, means for maintaining a flow of a gaseous medium the temperature of which reflects the temperature of the gases escaping through the furnace stack through the same said chamber, means for maintaining a flow of a gaseous medium the temperature of which reflects the temperature of a third factor affecting the temperature of the enclosed space to be heated through the said chamber, means for proportioning the relative rates of flow of said air and of said gaseous mediums through said chamber, and temperature responsive means adapted to control said furnace arranged in said chamber.

2. An improved heating furnace control comprising a thermostat chamber, means for maintaining a flow of air from an enclosed space to be heated through said chamber, means for maintaining a flow of a gaseous medium the temperature of which reflects the temperature of the gases escaping through the furnace stack through the same said chamber, means for maintaining a flow of a gaseous medium the temperature of which reflects the temperature of a third factor affecting the temperature of the enclosed space to be heated through the said chamber, means for proportioning the relative rates of flow of said air and of said gaseous mediums through said chamber, and temperature responsive means adapted to increase the rate of supply of air for combustion in said furnace as the mean temperature in said chamber decreases and to decrease said rate of supply as said mean temperature increases.

3. An improved heating furnace control comprising a thermostat chamber, means for maintaining a flow of air from an enclosed space to be heated through said chamber, means for maintaining a flow of a gaseous medium the temperature of which reflects the temperature of the gases escaping through the furnace stack through the same said chamber, means for maintaining a flow of a gaseous medium the temperature of which reflects the outdoor temperature through the said chamber, means for proportioning the relative rates of flow of said air and of said gaseous mediums through said chamber, and temperature responsive means adapted to control said furnace arranged in said chamber.

4. An improved heating furnace control comprising a thermostat chamber, means for maintaining a flow of air from an enclosed space to be heated through said chamber, means for maintaining a flow of a gaseous medium the temperature of which reflects the temperature of the gases escaping through the furnace stack through the same said chamber, means for maintaining a flow of a gaseous medium the temperature of which reflects water temperatures in a hot water heating system through the said chamber, means for proportioning the relative rates of flow of said air and of said gaseous mediums through said chamber, and temperature responsive means adapted to control said furnace arranged in said chamber.

5. An improved heating furnace control comprising a thermostat chamber, means for maintaining a flow of air from an enclosed space to be heated through said chamber, means for maintaining a flow of another gaseous medium the temperature of which reflects water temperatures in a hot water heating system through the said chamber, means for proportioning the relative rates of flow of said air and of said gaseous medium through said chamber, and temperature responsive means adapted to control said furnace arranged in said chamber.

6. An improved heating furnace control comprising a thermostat chamber, means for maintaining a flow of air from an enclosed space to be heated through said chamber, means for maintaining a flow of a gaseous medium the temperature of which reflects the temperature of the gases escaping through the furnace stack through the same said chamber, means for maintaining a flow of a gaseous medium the temperature of which reflects steam temperatures in a steam heating system through the said chamber, means for proportioning the relative rates of flow of said air and of said gaseous mediums through said chamber, and temperature responsive means adapted to control said furnace arranged in said chamber.

7. An improved heating furnace control comprising a thermostat chamber, means for maintaining a flow of air from an enclosed space to be heated through said chamber, means for maintaining a flow of another gaseous medium the temperature of which reflects steam temperatures in a steam heating system through the said chamber, means for proportioning the relative rates of flow of said air and of said gaseous medium through said chamber, and temperature responsive means adapted to control said furnace arranged in said chamber.

8. An improved heating furnace control comprising a thermostat chamber, means for maintaining a flow of air from an enclosed space to be heated through said chamber, means for maintaining a flow of a gaseous medium the temperature of which reflects the temperature of the gases escaping through the furnace stack through the same said chamber, means for maintaining a flow of a gaseous medium the temperature of which reflects the temperature of outgoing hot air in a hot air heating system through the said chamber, means for proportioning the relative rates of flow of said air and of said gaseous mediums through said chamber, and temperature responsive means adapted to control said furnace arranged in said chamber.

9. An improved heating furnace control comprising a thermostat chamber, means for maintaining a flow of air from an enclosed space to be heated through said chamber, means for maintaining a flow of another gaseous medium the temperature of which reflects the temperature of outgoing hot air in a hot air heating system through the said chamber, means for proportioning the relative rates of flow of said air and of said gaseous medium through said chamber, and temperature responsive means adapted to control said furnace arranged in said chamber.

10. An improved heating furnace control comprising a thermostat chamber, means for maintaining a flow of air from an enclosed space to be heated through said chamber, means for maintaining a flow of a gaseous medium the temperature of which reflects the temperature of the gases escaping through the furnace stack through the same said chamber, means for maintaining a flow of a gaseous medium the temperature of which reflects the temperature of return air in a hot air heating system through the said chamber, means for proportioning the relative rates of flow of said air and of said gaseous mediums through said chamber, and temperature responsive means adapted to control said furnace arranged in said chamber.

11. An improved heating furnace control comprising a thermostat chamber, means for maintaining a flow of air from an enclosed space to be heated through said chamber, means for maintaining a flow of another gaseous medium the temperature of which reflects the temperature of return air in a hot air heating system through the said chamber, means for proportioning the relative rates of flow of said air and of said gaseous medium through said chamber, and temperature responsive means adapted to control said furnace arranged in said chamber.

12. An improved heating furnace control comprising a thermostat chamber, means for maintaining a flow of air from an enclosed space to be heated through said chamber, means for subjecting said thermostat chamber to the influence of the furnace stack temperature, means for maintaining a flow of another gaseous medium reflecting a temperature other than stack temperature affecting the temperature of the enclosed space to be heated through the same said chamber, means for controlling the relative effects of said gaseous mediums and of said furnace stack temperature upon said chamber, and temperature responsive means adapted to control said furnace arranged in said chamber.

13. An improved heating furnace control comprising a thermostat chamber, means for maintaining a flow of air from an enclosed space to be heated through said chamber, means for subjecting said thermostat chamber to the influence of the furnace stack temperature, means for maintaining a flow of another gaseous medium reflecting a temperature other than stack temperature affecting the temperature of the enclosed space to be heated through the same said chamber, means for controlling the relative effects of said gaseous medium and of said furnace stack temperature upon said chamber, and temperature responsive means adapted to increase the rate of supply of air for combustion in said furnace as the mean temperature in said chamber decreases and to decrease said rate of supply as said mean temperature increases.

14. An improved heating furnace control comprising a thermostat chamber, means for maintaining a flow of air from an enclosed space to be heated through said chamber, means for subjecting said thermostat chamber to the influence of the furnace stack temperature, means for maintaining a flow of another gaseous medium the temperature of which reflects the outdoor temperature through said chamber, means for controlling the relative effects of said gaseous mediums and of said furnace stack temperature upon said chamber and temperature responsive means adapted to control said furnace arranged in said chamber.

15. An improved heating furnace control comprising a thermostat chamber, means for maintaining a flow of air from an enclosed space to be heated through said chamber, means for subjecting said thermostat chamber to the influence of the furnace stack temperature, means for maintaining a flow of another gaseous medium the temperature of which reflects water temperatures in a hot water heating system through said chamber, means for controlling the relative effects of said gaseous mediums and of said furnace stack temperature upon said chamber and temperature responsive means adapted to control said furnace arranged in said chamber.

16. An improved heating furnace control comprising a thermostat chamber, means for maintaining a flow of air from an enclosed space to be heated through said chamber, means for subjecting said thermostat chamber to the influence of the furnace stack temperature, means for maintaining a flow of another gaseous medium the temperature of which reflects steam temperatures in a steam heating system through said chamber, means for controlling the relative effects of said gaseous mediums and of said furnace stack temperature upon said chamber and temperature responsive means adapted to control said furnace arranged in said chamber.

17. An improved heating furnace control comprising a thermostat chamber, means for maintaining a flow of air from an enclosed space to be heated through said chamber, means for subjecting said thermostat chamber to the influence of the furnace stack temperature, means for maintaining a flow of another gaseous medium the temperature of which reflects the temperature of outgoing hot air in a hot air heating system through said chamber, means for controlling the relative effects of said gaseous mediums and of said furnace stack temperature upon said chamber, and temperature responsive means adapted to control said furnace arranged in said chamber.

18. An improved heating furnace control comprising a thermostat chamber, means for maintaining a flow of air from an enclosed space to be heated through said chamber, means for subjecting said thermostat chamber to the influence of the furnace stack temperature, means for maintaining a flow of another gaseous medium the temperature of which reflects the temperature of return air of a hot air heating system through said chamber, means for controlling the relative effects of said gaseous mediums and of said furnace stack temperature upon said chamber, and temperature responsive means adapted to control said furnace arranged in said chamber.

19. An improved heating furnace control comprising a thermostat chamber, means for maintaining a flow of gaseous medium the temperature of which reflects the outdoor temperature through said chamber, means for subjecting said thermostat chamber to the influence of the furnace stack temperature, means for controlling the relative effects of said gaseous medium and of said furnace stack temperature upon said chamber, and temperature responsive means adapted to control said furnace arranged in said chamber.

20. An improved heating furnace control comprising a thermostat chamber, means for maintaining a flow of gaseous medium the temperature of which reflects the outdoor temperature through said chamber, means for subjecting said thermostat chamber to the influence of the furnace stack temperature, means for controlling the relative effects of said gaseous medium and of said furnace stack temperature upon said chamber, and temperature responsive means adapted to increase the rate of supply of air for combustion in said furnace as the mean temperature in said chamber decreases and to decrease said rate of supply as said mean temperature increases.

21. An improved heating furnace control comprising a thermostat chamber, means for subjecting said chamber to the influence of the temperature of an enclosed space to be heated, means for subjecting said thermostat chamber to the influence of the furnace stack temperature, means for subjecting said thermostat chamber to the influence of the temperature of a third factor affecting the temperature of the enclosed space to be heated, means for controlling the relative effects of said temperatures upon said chamber, and temperature responsive means adapted to control said furnace arranged in said chamber.

22. An improved heating furnace control comprising a thermostat chamber, means for subjecting said chamber to the influence of the temperature of an enclosed space to be heated, means for subjecting said chamber to the influence of the furnace stack temperature, means for subjecting said chamber to the influence of the outdoor temperature, means for controlling the relative effects of said temperatures upon said chamber, and temperature responsive means adapted to control said furnace arranged in said chamber.

23. An improved heating furnace control comprising a thermostat chamber, means for subjecting said chamber to the influence of the temperature of an enclosed space to be heated, means for subjecting said chamber to the influence of the furnace stack temperature, means for subjecting said chamber to the influence of a chamber which reflects water temperatures in a hot water heating system, means for controlling the relative effects of said temperatures upon said chamber, and temperature responsive means adapted to control said furnace arranged in said chamber.

24. An improved heating furnace control comprising a thermostat chamber, means for subjecting said chamber to the influence of the temperature of an enclosed space to be heated, means for subjecting said chamber to the influence of the furnace stack temperature, means for subjecting said chamber to the influence of a temperature which reflects steam temperatures in a steam heating system, means for controlling the relative effects of said temperatures upon said chamber, and temperature responsive means adapted to control said furnace arranged in said chamber.

25. An improved heating furnace control comprising a thermostat chamber, means for subjecting said chamber to the influence of the temperature of an enclosed space to be heated, means for subjecting said chamber to the influence of the furnace stack temperature, means for subjecting said chamber to the influence of a temperature which reflects the temperature of outgoing hot air in a hot air heating system, means for controlling the relative effects of said temperatures upon said chamber, and temperature responsive means adapted to control said furnace arranged in said chamber.

26. An improved heating furnace control comprising a thermostat chamber, means for subjecting said chamber to the influence of the temperature of an enclosed space to be heated, means for subjecting said chamber to the influence of the furnace stack temperature, means for subjecting said chamber to the influence of a temperature which reflects the temperature of return air of a hot air heating system, means for controlling the relative effects of said temperatures upon said chamber, and temperature responsive means adapted to control said furnace arranged in said chamber.

27. An improved heating furnace control comprising a thermostat chamber, means for subjecting said chamber to the influence of the temperature of an enclosed space to be heated, means for subjecting said chamber to the influence of a temperature other than stack temperature affecting the temperature of the enclosed space to be heated, means for controlling the relative effects of said temperatures upon said chamber, and temperature responsive means adapted to control said furnace arranged in said chamber.

28. An improved heating furnace control comprising a thermostat chamber, means for maintaining a flow of a gaseous medium the temperature of which reflects the outdoor temperature through said chamber, means for maintaining a flow of another gaseous medium the temperature of which reflects the temperature of a second factor affecting the temperature of the enclosed chamber to be heated through said chamber, means for controlling the relative effects of said gaseous media upon said chamber, and temperature responsive means adapted to control said furnace arranged in said chamber.

29. An improved heating furnace control comprising a thermostat chamber, means for maintaining a flow of a gaseous medium the temperature of which reflects the temperature of a factor affecting the temperature of the enclosed space to be heated through said chamber, means for subjecting said thermostat chamber to the influence of outdoor temperature, means for controlling the relative effects of said gaseous medium and of said outdoor temperature upon said chamber, and temperature responsive means adapted to control said furnace arranged in said chamber.

RUSSELL W. STEM.